US006988946B2

(12) United States Patent
Michaelson et al.

(10) Patent No.: US 6,988,946 B2
(45) Date of Patent: Jan. 24, 2006

(54) CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME

(75) Inventors: Richard E. Michaelson, Reno, NV (US); Mark W. Bansemer, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 470 days.

(21) Appl. No.: 10/371,723

(22) Filed: Feb. 21, 2003

(65) Prior Publication Data

US 2004/0166922 A1 Aug. 26, 2004

(51) Int. Cl.
*A63F 9/24* (2006.01)

(52) U.S. Cl. .............................. 463/17; 463/42; 463/22
(58) Field of Classification Search ...................... None
See application file for complete search history.

(56) References Cited

U.S. PATENT DOCUMENTS

| | | | |
|---|---|---|---|
| 4,157,829 A | 6/1979 | Goldman et al. | |
| 4,335,809 A | 6/1982 | Wain | |
| 4,339,798 A | 7/1982 | Hedges et al. | |
| 4,467,424 A | 8/1984 | Hedges et al. | |
| 4,494,197 A | 1/1985 | Troy et al. | |
| 4,582,324 A | 4/1986 | Koza et al. | |
| 4,652,998 A | 3/1987 | Koza et al. | |
| 4,669,730 A | 6/1987 | Small | |
| 4,689,742 A | 8/1987 | Troy et al. | |
| 4,805,907 A | 2/1989 | Hagiwara | |
| 4,815,741 A | 3/1989 | Small | |
| 4,817,951 A | 4/1989 | Crouch et al. | |
| 4,842,278 A | 6/1989 | Markowicz | |
| 4,856,787 A | 8/1989 | Itkis | |
| 4,982,337 A | 1/1991 | Burr et al. | |
| 5,042,809 A | 8/1991 | Richardson | |
| 5,092,598 A | 3/1992 | Kamille | |
| 5,100,139 A | 3/1992 | Di Bella | |
| 5,158,293 A | 10/1992 | Mullins | |
| 5,265,874 A | 11/1993 | Dickinson et al. | |
| 5,276,312 A | 1/1994 | McCarthy | |

(Continued)

FOREIGN PATENT DOCUMENTS

GB 2 374 294 A 10/2002

(Continued)

OTHER PUBLICATIONS

Lucky Times California Lottery newsletter published 1996.

(Continued)

*Primary Examiner*—Mark Sager
(74) *Attorney, Agent, or Firm*—Bell Boyd & Lloyd LLC

(57) ABSTRACT

A central determination gaming system with a central controller providing a game outcome to an individual gaming terminal and the gaming terminal determining the presentation of the provided game outcome. In one embodiment of the present invention, a gaming terminal receives a predetermined game outcome from a central controller. The gaming terminal determines a game outcome presentation, (i.e., how the game outcome is displayed or presented to the player) for the provided game outcome by selecting a game presentation seed for the received game outcome. The gaming terminal utilizes the selected game presentation seed to determine a game outcome presentation. The determined game outcome presentation is displayed to the player and the received game outcome is provided to the player.

51 Claims, 7 Drawing Sheets

U.S. PATENT DOCUMENTS

| | | | |
|---|---|---|---|
| 5,282,620 | A | 2/1994 | Keesee |
| 5,324,035 | A | 6/1994 | Morris et al. |
| 5,398,932 | A | 3/1995 | Eberhardt et al. |
| 5,407,199 | A | 4/1995 | Gumina |
| 5,586,937 | A | 12/1996 | Menashe |
| 5,628,684 | A | 5/1997 | Bouedec |
| 5,674,128 | A | 10/1997 | Holch et al. |
| 5,779,545 | A | 7/1998 | Berg et al. |
| 5,800,269 | A | 9/1998 | Holch et al. |
| 5,871,398 | A | 2/1999 | Schneier et al. |
| 5,944,606 | A | 8/1999 | Gerow |
| 5,949,042 | A | 9/1999 | Dietz, II et al. |
| 5,954,582 | A | 9/1999 | Zach |
| 5,970,143 | A | 10/1999 | Schneier et al. |
| 6,017,032 | A | 1/2000 | Grippo et al. |
| 6,024,640 | A | 2/2000 | Walker et al. |
| 6,079,711 | A | 6/2000 | Wei et al. |
| 6,089,982 | A | 7/2000 | Holch et al. |
| 6,099,408 | A | 8/2000 | Schneier et al. |
| 6,117,009 | A | 9/2000 | Yoseloff |
| 6,146,272 | A | 11/2000 | Walker et al. |
| 6,168,521 | B1 | 1/2001 | Luciano et al. |
| 6,183,361 | B1 | 2/2001 | Cummings et al. |
| 6,210,275 | B1 | 4/2001 | Olsen |
| 6,210,276 | B1 | 4/2001 | Mullins |
| 6,217,448 | B1 | 4/2001 | Olsen |
| 6,220,961 | B1 | 4/2001 | Keane et al. |
| 6,241,606 | B1 | 6/2001 | Riendeau et al. |
| 6,250,685 | B1 | 6/2001 | Walker et al. |
| 6,254,480 | B1 | 7/2001 | Zach |
| 6,273,820 | B1 | 8/2001 | Haste, III |
| 6,280,328 | B1 | 8/2001 | Holch et al. |
| 6,309,298 | B1 | 10/2001 | Gerow |
| 6,325,716 | B1 | 12/2001 | Walker et al. |
| 6,358,151 | B1 | 3/2002 | Enzminger et al. |
| 6,368,218 | B2 | 4/2002 | Angell, Jr. |
| 6,402,614 | B1 | 6/2002 | Schneier et al. |
| 6,419,583 | B1 | 7/2002 | Crumby et al. |
| 6,443,837 | B1 | 9/2002 | Jaffe et al. |
| 6,450,885 | B2 | 9/2002 | Schneier et al. |
| 6,454,648 | B1 | 9/2002 | Kelly et al. |
| RE37,885 | E | 10/2002 | Acres et al. |
| 6,475,086 | B2 | 11/2002 | Zach |
| 6,508,711 | B1 | 1/2003 | Ono |
| 6,524,184 | B1 | 2/2003 | Lind et al. |
| 6,527,638 | B1 | 3/2003 | Walker et al. |
| 6,533,664 | B1 | 3/2003 | Crumby |
| 6,537,150 | B1 | 3/2003 | Luciano et al. |
| 6,656,044 | B1 | 12/2003 | Lewis |
| 6,729,961 | B1 | 5/2004 | Millerschone |
| 6,749,500 | B1 | 6/2004 | Nelson et al. |
| 2002/0010013 | A1 | 1/2002 | Walker et al. |
| 2002/0072404 | A1 | 6/2002 | Gerow |
| 2002/0082070 | A1 | 6/2002 | Macke et al. |
| 2002/0098882 | A1 | 7/2002 | Lind et al. |
| 2002/0098883 | A1 | 7/2002 | Packes, Jr. et al. |
| 2002/0111214 | A1 | 8/2002 | Lind et al. |
| 2002/0113369 | A1 | 8/2002 | Weingardt |
| 2002/0169018 | A1 | 11/2002 | Schneier et al. |
| 2003/0193136 | A1 | 10/2003 | Walker et al. |

FOREIGN PATENT DOCUMENTS

| | | |
|---|---|---|
| WO | WO 00/67424 | 11/2000 |
| WO | WO 02/097749 A2 | 12/2002 |

OTHER PUBLICATIONS

Instant Winner Advertisement by Williams/WMS Gaming, published prior to 2002.

CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME

This application relates to the following commonly owned patent applications: "GAMING SYSTEM WITH INDIVIDUALIZED CENTRALLY GENERATED RANDOM NUMBER GENERATOR SEEDS," Ser. No. 09/519,947, now U.S. Pat. No. 6,533,664; "GAMING DEVICE INCLUDING OUTCOME POOLS FOR PROVIDING GAME OUTCOMES," Ser. No. 10/261,744, "APPARATUS AND METHOD FOR GENERATING A POOL OF SEEDS FOR A CENTRAL DETERMINATION GAMING SYSTEM," Ser. No. 10/371,722, "CENTRAL DETERMINATION GAMING SYSTEM WHERE THE SAME SEED IS USED TO GENERATE THE OUTCOMES FOR A PRIMARY GAME AND A SECONDARY GAME," Ser. No. 10/371,958, "CENTRAL DETERMINATION GAMING SYSTEM WHICH PROVIDES A PLAYER A CHOICE IN OUTCOMES," Ser. No. 10/442,318, "CENTRAL DETERMINATION GAMING SYSTEM WITH A GAME OUTCOME GENERATED BY A GAMING TERMINAL AND APPROVED BY A CENTRAL CONTROLLER," Ser. No. 10/383,423, "CENTRAL DETERMINATION GAMING SYSTEM WITH A GAMING TERMINAL ASSISTING THE CENTRAL CONTROLLER IN THE GENERATION OF A GAME OUTCOME," Ser. No. 10/431,755, and "CENTRAL DETERMINATION SYSTEM WITH A KENO GAME," Ser. No. 10/601,482.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a central determination gaming system, and more particularly to a central determination gaming system with a central controller providing a game outcome and a gaming terminal determining a presentation of the provided game outcome. The majority of the contemporary wagering gaming terminals or gaming devices, such as slot machines, randomly generate a game presentation, such as a plurality of symbols displayed on the reels of a slot machine to be presented or displayed to the player. The gaming terminal then analyzes the randomly generated game presentation in view of a predetermined pay table of all possible game presentations for the specific game played to determine the appropriate award and other outcome that corresponds with the generated game presentation. The determined game presentation is provided to the player. It should be appreciated that other contemporary gaming terminals also use probability data to directly generate awards or other outcomes.

Such probability-based gaming terminals typically include a relatively low probability associated with obtaining the highest award or obtaining a game presentation that corresponds to the highest award, relatively medium probabilities associated with obtaining medium range awards or obtaining game presentations that corresponds to medium range awards and relatively higher probabilities associated with low range awards or obtaining game presentations that corresponds to obtaining low range awards. These gaming terminals also include probabilities associated with obtaining losses or no award at all.

The probabilities of obtaining the awards and the amount of the awards determine the average expected pay out percentage of these wagering gaming terminals. Because the outcomes of these gaming terminals are randomly determined or completely based upon a probability calculation, there is no certainty that a player will ever obtain any particular award. That is, no matter how many times a player plays the game, since the gaming terminal generates outcomes completely based upon a probability calculation, there is no certainty that the game will ever provide the player with a rare outcome, such as a jackpot award, or any other specific value for that matter. On the other hand, due to the random determination, the gaming terminal can provide the rare outcomes, such as jackpot awards, numerous times in a small number of plays. For example, a probability-based $1 slot machine gaming terminal may be programmed to payback 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based slot machine gaming terminal, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming terminals in-part for these reasons. These regulatory bodies permit the use of wagering gaming terminals which are guaranteed to provide certain or definite awards, so that, for example, a certain number of wins is guaranteed and the overall amount paid back to players is guaranteed. That is, the payback percentage is fixed and not an average expected amount. One type of gaming terminal which complies with this requirement is an instant-type lottery gaming terminal. An instant-type lottery gaming terminal includes a finite pool or set of electronic tickets with each electronic ticket assigned to a predetermined outcome. Furthermore, each electronic ticket contains an indication of how the predetermined outcome is presented or displayed to the player. Alternatively, each electronic ticket could be assigned to a random number or game play seed. Each seed is deterministic of a predetermined outcome and how the predetermined outcome is presented or displayed to the player. That is, the gaming terminal utilizes the random number or game play seed in a random number sequence generator to generate random numbers. The gaming terminal uses the generated random numbers to determine, present and provide the predetermined outcome to the player. In an instant-type lottery gaming terminal, as the predetermined outcome for each electronic ticket is revealed to a player on the gaming terminal, the ticket is removed (i.e., flagged as used) from the finite pool or set of electronic tickets. Once flagged, a ticket cannot be used again to determine another game outcome. This type of gaming terminal provides players with all of the available outcomes over the course of the play cycle and guarantees the actual wins and losses.

Central determination gaming systems are also generally known. A central determination gaming system provides a plurality of individual gaming terminals, located in a gaming establishment, such as a casino, coupled by one or more communication links, to a central processor or controller. When a player plays a game on one of the gaming terminals, the game outcome and how the game outcome is presented or displayed to the player is communicated from the central processor or controller to the individual gaming terminal and then provided to the player. It should be appreciated that the central processor or controller may continuously run hundreds or thousands of individual gaming terminals at once. There are a number of advantages to providing for centralized production of game outcomes to be used at individual gaming terminals. For example, central production or control can assist a casino or other entity in maintaining proper records, controlling gaming, reducing and preventing cheating or electronic or other errors, reducing or eliminating win-loss volatility and the like.

In order to comply with the above mentioned regulatory rules that do not permit the use of probability-based gaming terminals, central determination gaming systems have been implemented wherein the central processor or controller maintains one or more predetermined pools or sets of game outcomes. Additionally, certain central determination gaming systems have also been implemented wherein the central system maintains one or more predetermined pools or sets of random number or game outcome seeds. However, this requires a great deal of memory for the central processor or controller because in addition to storing each game outcome, the central processor or controller must also store how each game outcome in each pool or set of game outcomes is presented or displayed to the player, such as how the reels stop in the case of a slot machine, how the cards are dealt or drawn in the case of a card game and the like.

Gaming devices having a primary or base game and a secondary or a bonus game are also well known. A secondary or bonus game may be any type of suitable game, either similar to or completely different from the primary game, which is entered upon the occurrence of a triggering event or a selected outcome in the primary game. The secondary or bonus game enables the player to obtain a prize or payout in addition to the prize or payout, if any, obtained from the primary game. A secondary or bonus game produces a significantly higher level of player excitement than the primary game because it provides a greater expectation of winning than the primary game and is accompanied with more attractive or unusual features than the primary game.

SUMMARY OF THE INVENTION

The present invention relates to a central determination gaming system with a central controller providing a game outcome to an individual gaming terminal and the gaming terminal determining the presentation of the provided game outcome.

In one embodiment of the present invention, a plurality of gaming terminals or gaming devices are in communication with a central controller. Upon a player initiating a game at one of the gaming terminals, the initiated gaming terminal communicates a request for a game outcome to the central controller. The central controller receives the request and selects a game outcome from a set or pool of predetermined game outcomes. Each game outcome includes an outcome component (i.e., a win game, a lose game or a bonus game trigger) and a value component (i.e., the pay amount, if any). It should be appreciated that, in this embodiment, each game outcome does not include how the game outcome will be presented or displayed to the player. The central controller flags the selected game outcome as used (prohibiting it from being selected again by the central controller) and communicates the selected game outcome to the requesting gaming terminal.

With a game outcome provided by the central controller, the requesting gaming terminal proceeds to determine a game outcome presentation for the provided game outcome. A game outcome presentation includes how the provided game outcome is displayed or presented to the player, such as the displayed reel symbol combination of a slot machine or the displayed cards drawn in a card game. It should be appreciated that with reference to an appropriate pay table for the specific game played, each game outcome presentation is associated with a game outcome.

To determine a game outcome presentation for the provided game outcome, the processor of the gaming terminal accesses a gaming terminal generated table or cache of game presentation seeds for the specific game played. Each game presentation seed is deterministic of a game outcome presentation. That is, the processor of the gaming terminal is operable to utilize each game presentation seed in a random number generating algorithm to generate at least one and preferably a plurality of random numbers. The generated random numbers are used to determine a game outcome presentation. It should be appreciated that since each game presentation seed is deterministic of a game outcome presentation and each game outcome presentation is associated with or corresponds to a game outcome, each game presentation seed is associated with or corresponds to a game outcome.

The processor of the gaming terminal determines if the table or cache includes at least one game presentation seed that corresponds to the provided game outcome. For example, if the provided game outcome is a win $3 outcome, the processor determines if the table or cache includes any game presentation seeds that are deterministic of a game presentation that corresponds to a win $3 outcome. If the table or cache does include at least one game presentation seed that corresponds to the provided game outcome, the processor of the gaming terminal randomly selects a game presentation seed that corresponds to the provided game outcome. The processor of the gaming terminal utilizes the selected game presentation seed in a random number generating algorithm to generate at least one and preferably a plurality of random numbers that are used to determine the game outcome presentation. The determined game outcome presentation is displayed or presented to the player. If the provided game outcome is a win game outcome or a lose game outcome, the player is provided the pay amount, if any, and the game ends. If the provided game outcome is a bonus or secondary game triggering outcome, the game proceeds to enable the player to play the bonus or secondary game.

If the table or cache does not include at least one game presentation seed that corresponds to the provided game outcome, the processor of the gaming terminal accesses a stored predetermined or hard-copied list of game presentation seeds for the specific game played. The processor randomly selects a game presentation seed that corresponds to the provided game outcome and utilizes the selected game presentation seed in a random number generating algorithm to generate at least one and preferably a plurality of random numbers that are used to determine the game outcome presentation. The determined game presentation is displayed or presented to the player. If the provided game outcome is a win game outcome or a lose game outcome, the player is provided the associated pay amount, if any, and the game ends. If the provided game outcome is a bonus or secondary game triggering outcome, the game proceeds to enable the player to play the bonus or secondary game.

In this embodiment of the present invention, the central controller provides a predetermined game outcome and the gaming terminal determines how the provided game outcome is presented or displayed to the player. It should be appreciated that if the provided game outcome is a bonus or secondary game triggering outcome, the bonus or secondary game proceeds as described above. That is, in the bonus or secondary game, the central controller provides a predetermined bonus or secondary game outcome and the gaming terminal determines how the provided bonus or secondary game outcome is presented or displayed to the player. It should be appreciated that to increase player interest, each game outcome includes a plurality of different game outcome presentations that are each associated with the same game outcome. This provides that the same game outcome, such as a win $5 outcome, is displayed or presented to the player a plurality of different ways, such as thirty different reel combinations.

In an alternative embodiment of the present invention, the central controller includes at least one set or pool of predetermined game outcome seeds. Each game outcome seed is deterministic of a game outcome. That is, the gaming terminal utilizes the game outcome seed to determine a game outcome. In this embodiment, the central controller selects a game outcome seed, flags the selected game outcome seed as used (thus preventing the selected game outcome from a subsequent selection from the same set or pool) and communicates the selected game outcome seed to the requesting gaming terminal as described above. Upon receiving the selected game outcome seed, the processor of the gaming terminal utilizes the game outcome seed in a random number generating algorithm to generate at least one and preferably a plurality of random numbers. The gaming terminal uses the generated random numbers to determine a game outcome. With a determined game outcome, the gaming terminal proceeds with determining a game outcome presentation for the determined game outcome as described above. In this embodiment, each game outcome seed is deterministic of a game outcome, but not how that game outcome is displayed or presented to the player. It should be appreciated that for any two or more gaming terminals configured for playing the same game, the random numbers generated (and thus the game outcomes determined) by those two or more gaming terminals will be the same for the same game outcome seed because the same algorithm is employed.

In another embodiment, the central controller provides a selected game outcome seed to the gaming terminal and the gaming terminal determines the game outcome based on the selected game outcome seed. In this embodiment, if the determined game outcome is a win game outcome or a secondary game triggering outcome, the gaming terminal utilizes the selected game outcome seed to determine a game outcome presentation for the determined win game outcome or the determined secondary game triggering outcome. On the other hand, if the determined game outcome is a lose game outcome, the gaming terminal proceeds with determining how the determined lose game outcome is displayed or presented to the player as described above. It should be appreciated that since the gaming terminal determines the game outcome presentation for lose game outcomes only, the generated cache and predetermined list both only include game presentation seeds that correspond to lose game outcomes. In this embodiment, the central controller (through the communicated game outcome seed) provides not only a game outcome but also how a win game outcome or a secondary game triggering outcome is presented or displayed to the player while the gaming terminal determines how a lose game outcome is presented or displayed to the player.

Additional features and advantages of the present invention are described in, and will be apparent from, the following Detailed Description of the Invention and the figures.

DETAILED DESCRIPTION OF THE INVENTION

Figure 1:
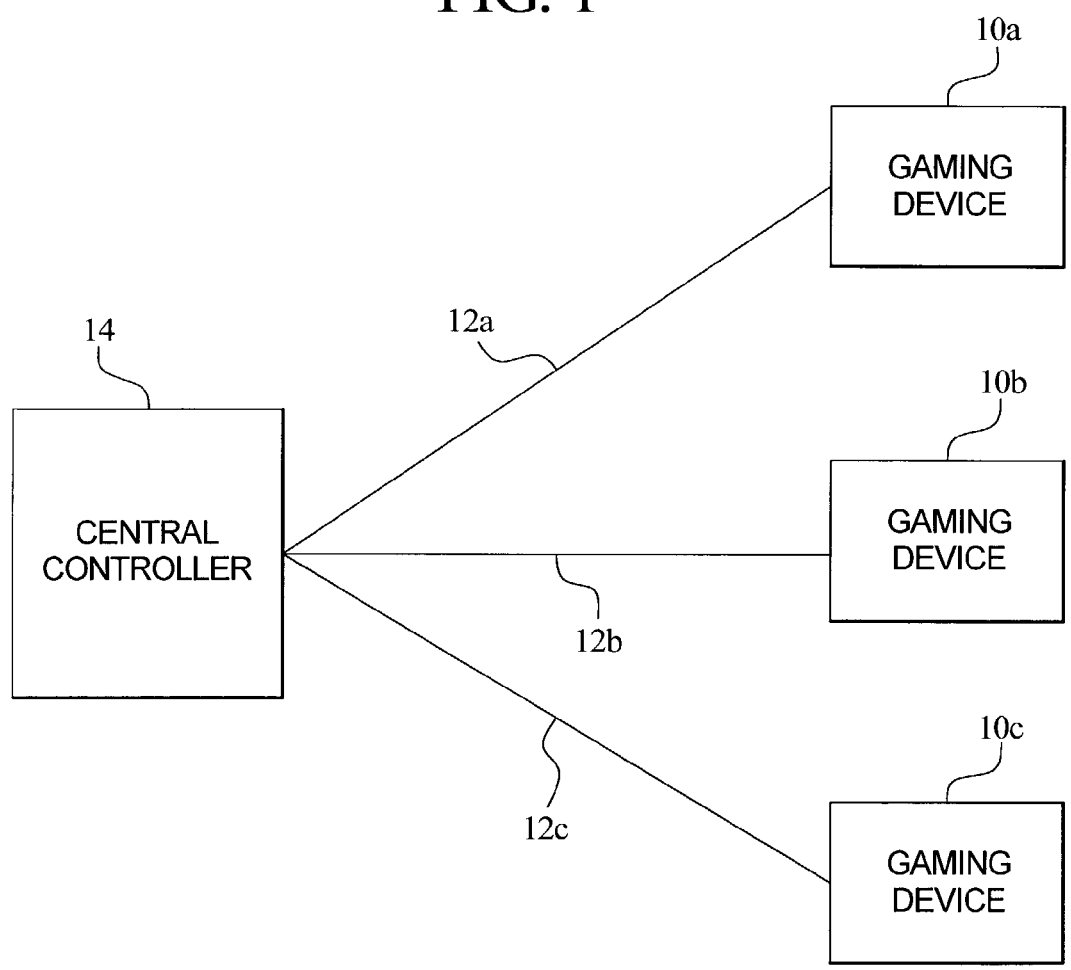
FIG. 1 is a schematic block diagram illustrating the distribution of the game outcome seeds from the central controller to the individual gaming terminals in the central determination gaming system of the present invention.

Referring now to the drawings, as illustrated in FIG. 1, one embodiment of the present invention includes a plurality of gaming terminals 10a, 10b and 10c located in a gaming establishment, such as a casino, coupled by one or more communication links 12a, 12b and 12c to a central controller 14. Although three gaming terminals are shown in FIG. 1, any suitable number of gaming terminals may be implemented in the present invention. The communication links 12 can be any of a plurality of devices known to those of skill in the art for receiving data transmissions to and from the gaming terminals.

The central controller includes a central processor and a memory storage device. The memory storage device is capable of storing a set or pool of predetermined game outcomes. In an alternative embodiment, the memory storage device is capable of storing a set or pool of predetermined game outcome seeds. The central controller maintains supervision over the entire network of gaming terminals 10 handling, for example, accounting, validation, security and selection of game outcomes (discussed in more detail below).

In one embodiment, all of the gaming terminals which are coupled to the central controller are configured to play the same type of game. In an alternative embodiment, a plurality of the gaming terminals are configured so that different gaming terminals may be used to play different types of games. That is, some gaming terminals may be used for playing a slot machine game, others may be used for playing a poker style game, others may be used for playing a blackjack style game, and the like. In another embodiment, a plurality of gaming terminals may each be configured for playing a plurality of different games.

Figure 2A:
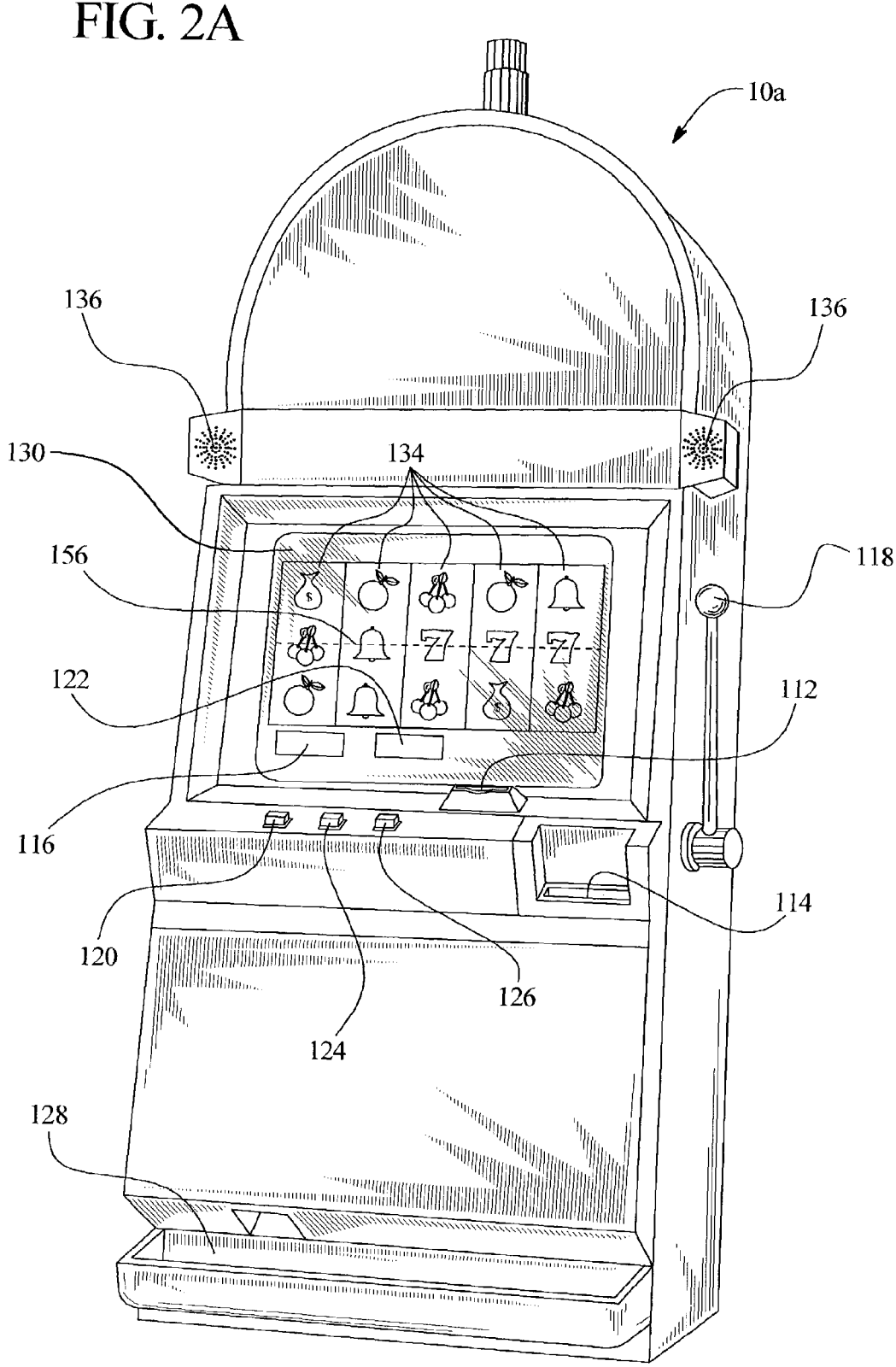
FIGS. 2A and 2B are perspective views of alternative embodiments of the gaming terminal of the present invention.
Figure 2B:
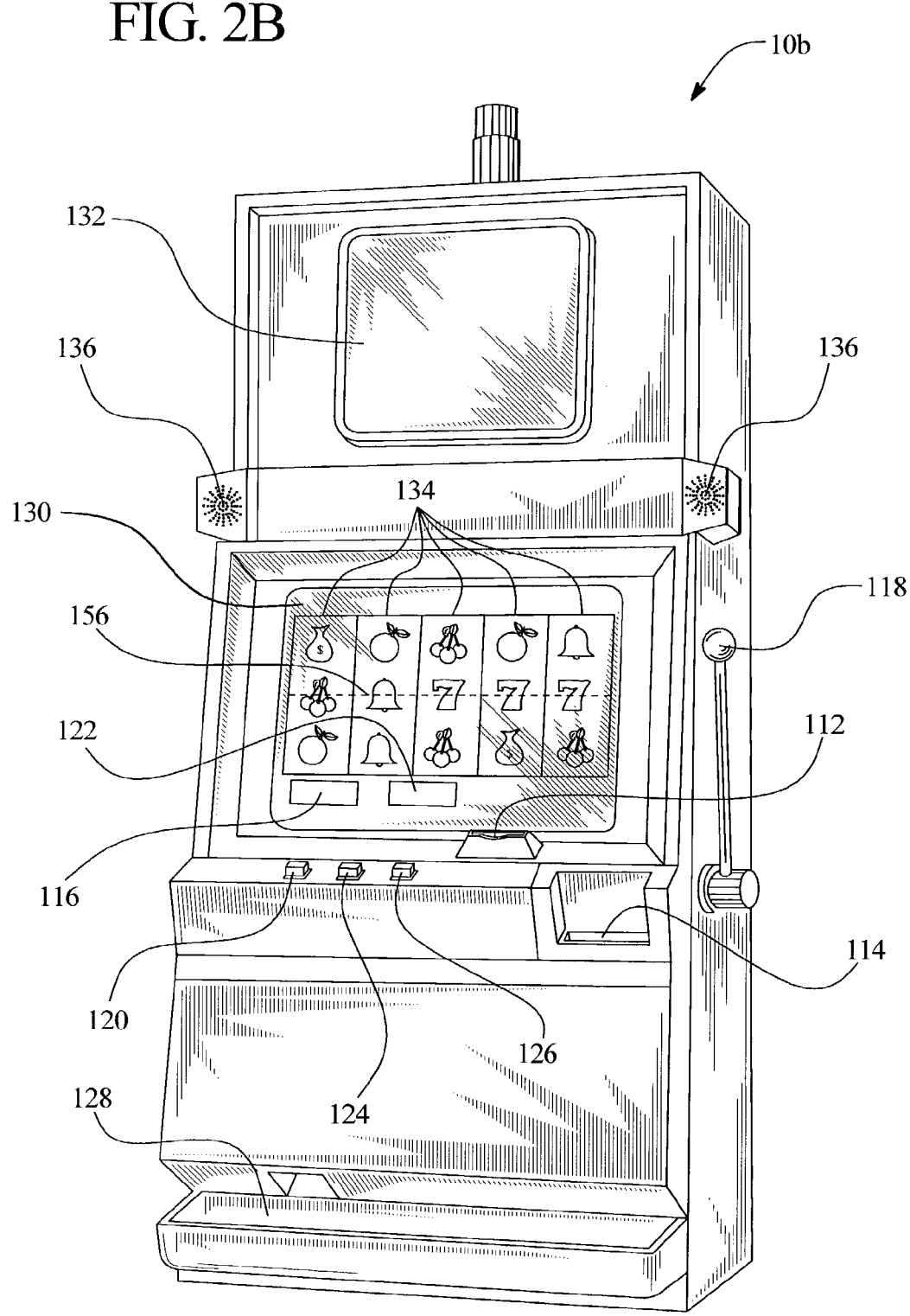

Two embodiments of the gaming terminal of the present invention are shown in FIGS. 2A and 2B as gaming terminal 10*a* and gaming terminal 10*b*, respectively. Gaming terminal 10*a* and/or gaming terminal 10*b* are generally referred to herein as gaming terminal 10. Gaming terminal 10 is in one embodiment a slot machine having the controls, displays and features of a conventional slot machine. It is constructed so that a player can operate it while standing or sitting, and gaming terminal 10 is preferably mounted on a console. However, it should be appreciated that gaming terminal 10 can be constructed as a pub-style table-top game (not shown) which a player can operate preferably while sitting. Furthermore, gaming terminal 10 can be constructed with varying cabinet and display designs, as illustrated by the designs shown in FIGS. 2A and 2B.

Gaming terminal 10 can incorporate any primary game such as slot, poker or keno, any of their bonus triggering events and any of their bonus round games. The symbols and indicia used on and in gaming terminal 10 may be mechanical, electrical or video form.

As illustrated in FIGS. 2A and 2B, gaming terminal 10 includes a coin slot 112 and bill acceptor 114 where the player inserts money, coins or tokens. The player can place coins in the coin slot 112 or paper money in the bill acceptor 114. Other devices could be used for accepting payment such as readers or validators for credit cards or debit cards. When a player inserts money in gaming terminal 10, a number of credits corresponding to the amount deposited is shown in a credit display 116. After depositing the appropriate amount of money, a player can begin the game by pulling arm 118 or pushing play button 120. Play button 120 can be any play activator used by the player which starts any game or sequence of events in the gaming terminal.

As shown in FIGS. 2A and 2B, gaming terminal 10 also includes a bet display 122 and a bet one button 124. The player places a bet by pushing the bet one button 124. The player can increase the bet by one credit each time the player pushes the bet one button 124. When the player pushes the bet one button 124, the number of credits shown in the credit display 116 decreases by one, and the number of credits shown in the bet display 122 increases by one.

A player may cash out and thereby receive a number of coins corresponding to the number of remaining credits by pushing a cash out button 126. When the player cashes out, the player receives the coins in a coin payout tray 128. The gaming terminal 10 may employ other payout mechanisms such as credit slips redeemable by a cashier or electronically recordable cards which keep track of the player's credits.

Gaming terminal 10 also includes one or more display devices. The embodiment shown in FIG. 2A includes a central display device 130, and the alternative embodiment shown in FIG. 2B includes a central display device 130 as well as an upper display device 132. Gaming terminal 10 preferably displays a plurality of reels 134, preferably three to five reels 134 in mechanical or video form at one or more of the display devices. A display device can be any viewing surface such as glass, a video monitor or screen, a liquid crystal display or any other display mechanism. If the reels 134 are in video form, the display device for the video reels 134 is preferably a video monitor.

Each reel 134 displays a plurality of indicia such as bells, hearts, fruits, numbers, letters, bars or other images which preferably correspond to a theme associated with the gaming terminal 10. The symbols and indicia used on and in gaming terminal 10 may be in mechanical, electronic, electrical or video form. Furthermore, gaming terminal 10 preferably includes speakers 136 for making sounds or playing music.

Figure 3:
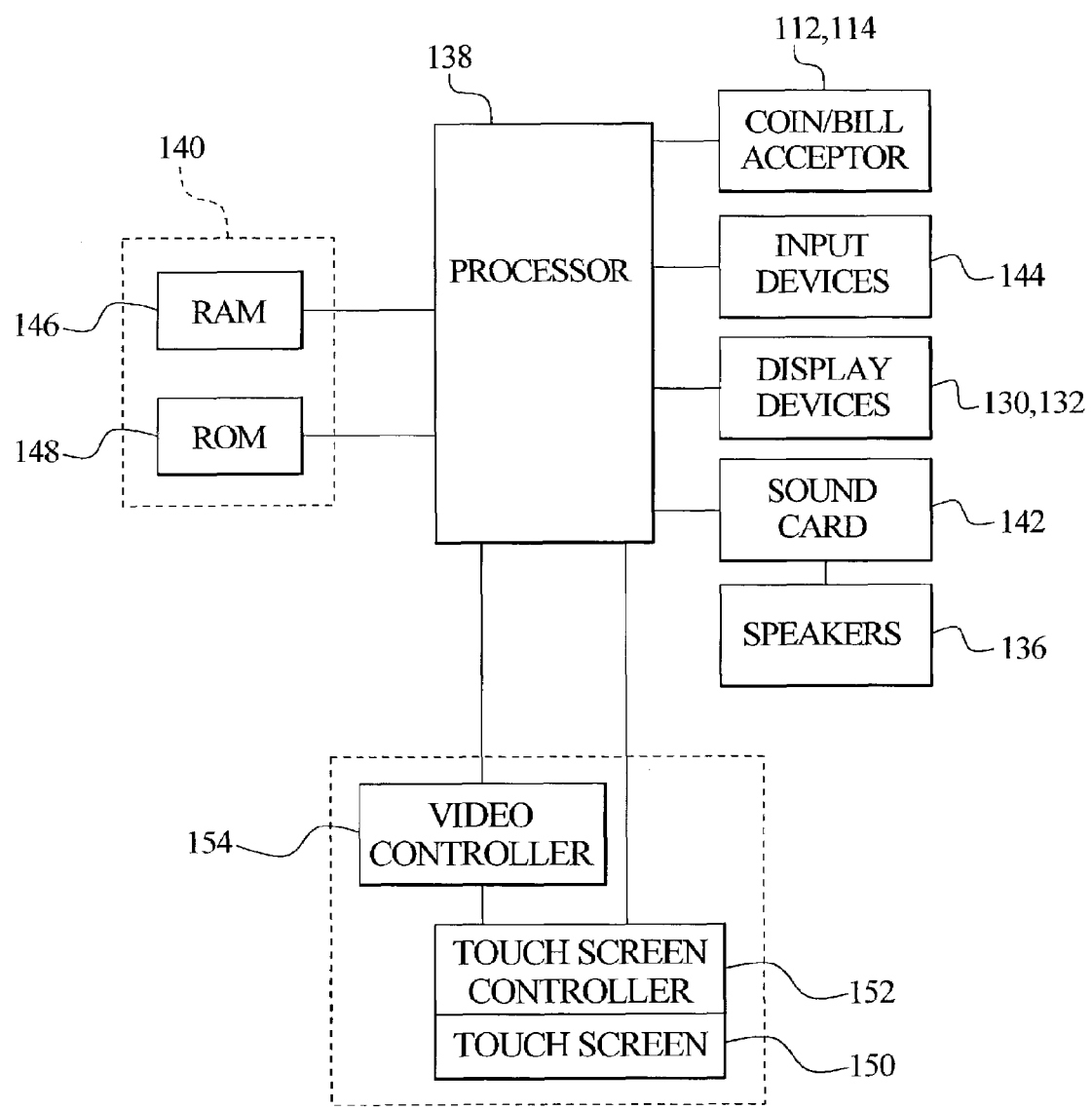
FIG. 3 is a schematic block diagram of an electronic configuration of one embodiment of the gaming terminal of the present invention.

As illustrated in FIG. 3, the general electronic configuration of gaming terminal 10 preferably includes: a processor 138; a memory device 140 for storing program code or other data; a central display device 130; an upper display device 132; a sound card 142; a plurality of speakers 136; and one or more input devices 144. The processor 138 is preferably a microprocessor or microcontroller-based platform which is capable of displaying images, symbols and other indicia such as images of people, characters, places, things and faces of cards. The memory device 140 can include random access memory (RAM) 146 for storing event data or other data generated or used during a particular game. The memory device 140 can also include read only memory (ROM) 148 for storing program code which controls the gaming terminal 10 so that it plays a particular game in accordance with applicable game rules and pay tables.

As illustrated in FIG. 3, the player preferably uses the input devices 144, such as pull arm 118, play button 120, the bet one button 124 and the cash out button 126 to input signals into gaming terminal 10. In certain instances it is preferable to use a touch screen 150 and an associated touch screen controller 152 instead of a conventional video monitor display device. Touch screen 150 and touch screen controller 152 are connected to a video controller 154 and processor 138. A player can make decisions and input signals into the gaming terminal 10 by touching touch screen 150 at the appropriate places. As further illustrated in FIG. 3, the processor 138 can be connected to coin slot 112 or bill acceptor 114. The processor 138 can be programmed to require a player to deposit a certain amount of money in order to start the game.

It should be appreciated that although a processor 138 and memory device 140 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 138 and memory device 140 preferably reside on each gaming terminal 10 unit, it is possible to provide some or all of their functions at a central location such as a network server for communication to a playing station such as over a local area network (LAN), wide area network (WAN), Internet connection, microwave link, and the like.

In addition to winning base game credits, the gaming terminal 10, including any of the base games disclosed above, also includes bonus games that give players the opportunity to win credits. The gaming terminal 10 preferably employs a video-based display device 130 or 132 for the bonus games. The bonus games include a program that automatically begins when the player achieves a qualifying condition or a bonus game triggering outcome in the base game.

In the slot machine embodiment, the qualifying condition or a bonus game triggering outcome includes a particular symbol or symbol combination generated on a display device. As illustrated in the five reel slot game shown in FIGS. 1A and 1B, the qualifying condition or bonus game triggering outcome includes the number seven appearing on three adjacent reels 134 along a payline 156. It should be appreciated that the present invention includes one or more paylines, such as payline 156, wherein the paylines can be horizontal, diagonal or any combination thereof.

In addition to enabling a player to play a game, the gaming terminal and specifically the processor is operable to generate and maintain a table or cache of game presentation seeds. Each game presentation seed is unique and deterministic of a specific game outcome presentation provided to the player. That is, the gaming terminal utilizes each game presentation seed in a random number generating algorithm to determine a game outcome presentation. A game outcome presentation is how each game outcome is presented or displayed to the player, such as a specific reel symbol combination displayed on a slot machine game.

To increase player excitement, in one embodiment, the number of different game outcome presentations generated and maintained in the table or cache preferably exceeds the number of different game outcomes. Each game outcome is preferably presented or displayed to a player a plurality of different ways, thus keeping the player interested in the game even though the player may be repeatedly provided the same game outcome. For example, the table or cache of the gaming terminal may include fifty different game presentation seeds that each correspond to the same win $5 outcome and are each deterministic of a different reel symbol combination of a slot machine.

Figure 4:
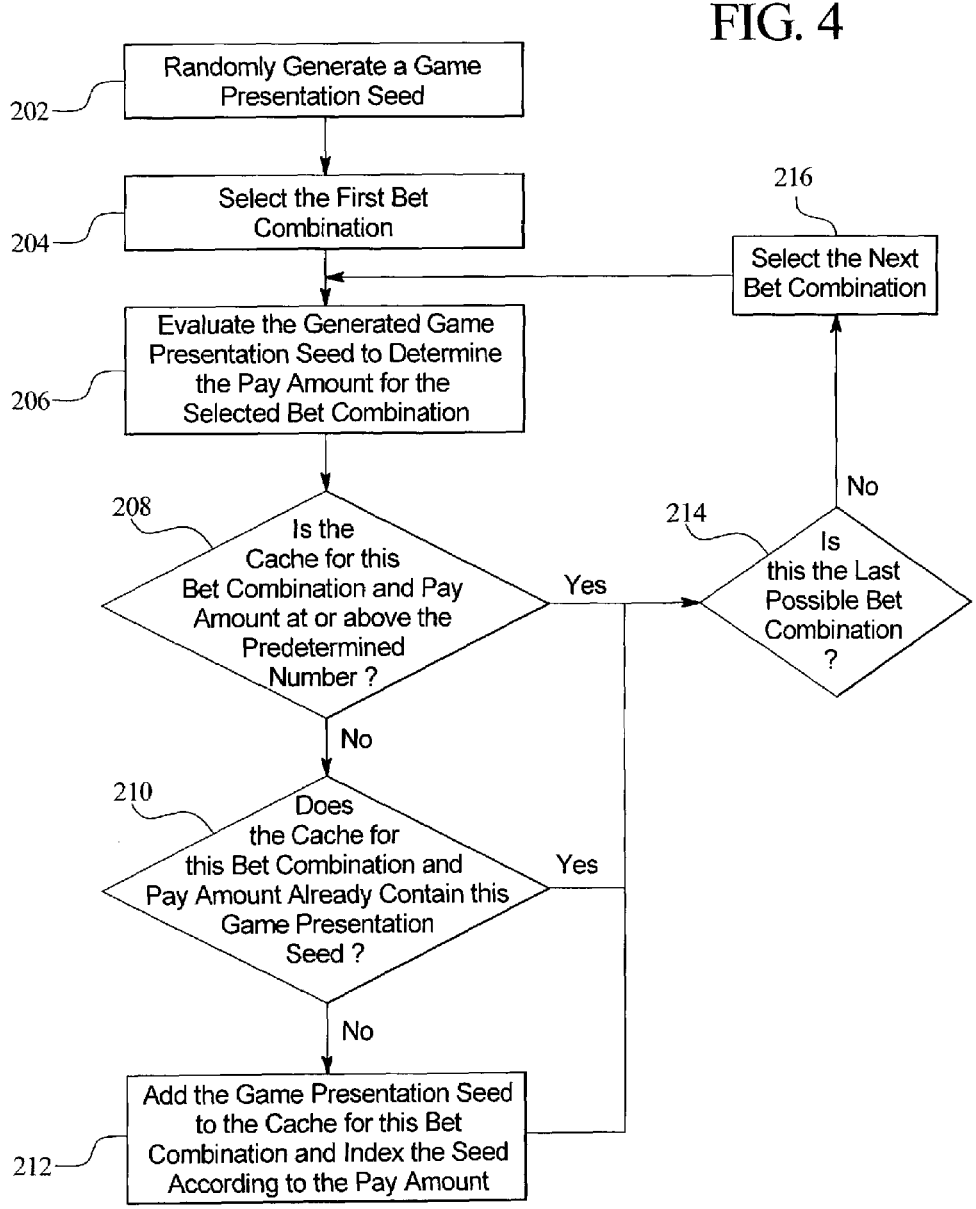
FIG. 4 is a schematic block diagram illustrating one embodiment of how the table or cache is generated and maintained by a gaming terminal of the present invention.

FIG. 4 generally illustrates how the processor of the gaming terminal generates the table or cache of game presentation seeds. As seen in FIG. 4, the processor of the gaming terminal randomly generates a game presentation seed as illustrated in block 202. The generated game presentation seed is deterministic of a specific game outcome presentation. For example, in a slot machine game, a game presentation seed is deterministic of a reel symbol combination presented to the player. In a poker style game, a game presentation seed is deterministic of a hand of cards presented to the player including the cards presented to the player during multiple draws of the same game. It should be appreciated that for multiple draw poker game, the game presentation seed used is deterministic of a plurality of numbers and the gaming terminal would continuously draw the determined numbers in sequence to fill the multiple draw hands.

The processor of the gaming terminal selects a first bet combination as indicated in block 204. Each bet combination represents a different paytable the gaming terminal will utilize for each game to be played on the gaming terminal. For example, if the gaming terminal is operable to play a blackjack type game and a poker type game, the paytables for each type of game would be different bet combinations. In another example, if the gaming terminal is operable to play a 9-line slot type game, each different active payline (and its associated different paytable) would be a different bet combination.

The processor of the gaming terminal utilizes the generated game presentation seed to determine a game outcome presentation (i.e., the specific reel symbol combination or hand of cards drawn). The determined game outcome presentation is evaluated in view of the selected bet combination to determine the corresponding game outcome (pay amount) that the generated presentation seed is deterministic of as indicated in block 206. For example, in a slot machine, if the processor of the gaming terminal determines that the generated game presentation seed is deterministic of the reel symbol combination of X-O-X, then using the selected bet combination, the gaming terminal determines that the reel symbol combination of X-O-X corresponds to a win $3 game outcome.

The processor of the gaming terminal next determines if the table or cache is already at or above a predetermined number or level of generated game presentation seeds for the selected bet combination and pay amount as indicated by diamond 208. In one embodiment, the table or cache is capable of storing one game presentation seed for each bet combination and pay amount. In another embodiment, the table or cache is capable of storing a plurality of each of the same game presentation seeds for each bet combination and pay amount.

If the table or cache is not already at or above the predetermined number or level of game presentation seeds for the selected bet combination and pay amount, the processor of the gaming terminal determines if the table or cache already contains at least one of the same generated game presentation seeds for the selected bet combination as indicated by diamond 210. That is, if the game presentation seed is deterministic of an X-O-X reel symbol combination, the gaming terminal determines if the table or cache already contains at least one X-O-X reel symbol combination for the selected bet combination. In another embodiment, the processor of the gaming terminal determines if the table or cache already contains a predetermined number of the generated game presentation seed for the selected bet combination. If the table or cache does not already contain the predetermined number of the generated game presentation seeds for the selected bet combination and pay amount, the generated game presentation seed is added to the table or cache for the selected bet combination and pay amount as indicated by block 212. For example, if the table or cache is operable to include twenty X-O-X reel symbol combination game presentation seeds, the gaming terminal determines the number of existing X-O-X reel symbol combination game presentation seeds and adds the generated X-O-X game presentation seed to the table or cache if the determined number is less than twenty.

In one embodiment, the generated game presentation seed is indexed in the table or cache for the selected bet combination according to the different game outcome (pay amount) that the game presentation seed corresponds to. In the above X-O-X game presentation seed example, if according to the selected bet combination, the X-O-X game presentation seed corresponds to a win $3 game outcome, then the X-O-X game presentation seed is indexed for the selected bet combination as a win $3 game outcome. In an alternative embodiment, each game presentation seed is indexed in the table or cache for the selected bet combination according to the different game outcome that the game presentation seed corresponds to as well as the different game presentation that the game presentation seed is deterministic of. For example, if the generated game presentation seed is deterministic of a X-O-X reel symbol combination which corresponds to a win $3 game outcome, then the generated game presentation seed is indexed in the table or cache as a win $3 X-O-X reel symbol combination.

If the table or cache is already at or above the predetermined level of game presentation seeds for the selected bet combination and pay amount or the table or cache already contains the predetermined number of the same generated game presentation seed for the selected bet combination, the processor of the gaming terminal determines if the selected bet combination is the last possible bet combination as indicated by diamond 214.

If the selected bet combination is not the last possible bet combination, the processor of the gaming device selects another bet combination as indicated by block 216. The processor of the gaming device evaluates the determined game outcome presentation in view of the next selected bet combination to determine the corresponding game outcome as indicated by block 206. The above described process is then continued until the table or cache is at or above the predetermined number or level of game presentation seeds for each bet combination. It should be appreciated that other suitable methods for generating the table or cache of game presentation seeds may be employed in the present invention.

In one embodiment, the gaming terminal is continuously selecting and flagging game presentation seeds from the table or cache (i.e., preventing the flagged game presentation seeds from subsequent selections) as each game is played on the gaming terminal. In this embodiment, the gaming terminal is continuously generating, indexing and maintaining new game presentation seeds to replace the previously used or flagged game presentation seeds. Thus, in this embodiment, even if the selected bet combination is the last possible bet combination (i.e., the table or cache is at or above the predetermined number or level of game presentation seeds for each bet combination), the processor of the gaming device randomly generates a new game presentation seed to replace the flagged game presentation seed and the process continues as described above. In another embodiment, even if the selected game presentation seeds are not flagged in the table or cache, the gaming terminal continues generating, indexing and maintaining new presentation seeds. In this embodiment, each new generated game presentation seed replaces a randomly selected existing game presentation seed.

In addition to generating and maintaining a table or cache of game presentation seeds for each possible game presentation, the gaming terminal also stores a hard-copied or predetermined list of at least one game presentation seed for each game presentation for each bet combination. This list is utilized in the event that the gaming terminal needs access to the table or cache prior to the table or cache having generated an appropriate game presentation seed as discussed in more detail below. In one embodiment, the stored predetermined or hard-copied list includes at least one game presentation seed that corresponds to each game outcome. In another embodiment, the stored predetermined list or hard-copied list includes at least one game presentation seed that is deterministic of each game outcome presentation. For example, if a slot machine game has one-thousand different reel symbol combinations, the stored predetermined or hard-copied list includes at least one game presentation seed which is deterministic of each of the one-thousand different reel symbol combinations.

In an alternative embodiment of the present invention (not shown), each game presentation seed generated and maintained by the gaming terminal is deterministic of a game outcome presentation that corresponds to a $0 lose game outcome. In this embodiment, if the generated game presentation seed is deterministic of a game outcome presentation that corresponds to a lose game outcome (a $0 pay amount) for the selected bet combination, the processor of the gaming terminal continues as described above. However, if the generated game presentation seed is not deterministic of a game outcome presentation that corresponds to a lose game outcome for the selected bet combination (i.e., the game presentation seed is deterministic of a game outcome presentation that corresponds to a win game outcome or a secondary game triggering outcome for the selected bet combination), the processor discards the generated game presentation seed and repeats the process as described above. Therefore, in this embodiment, the table or cache for each bet combination only includes game presentation seeds that are deterministic of game outcome presentations that corresponds to lose game outcomes.

Figure 5:
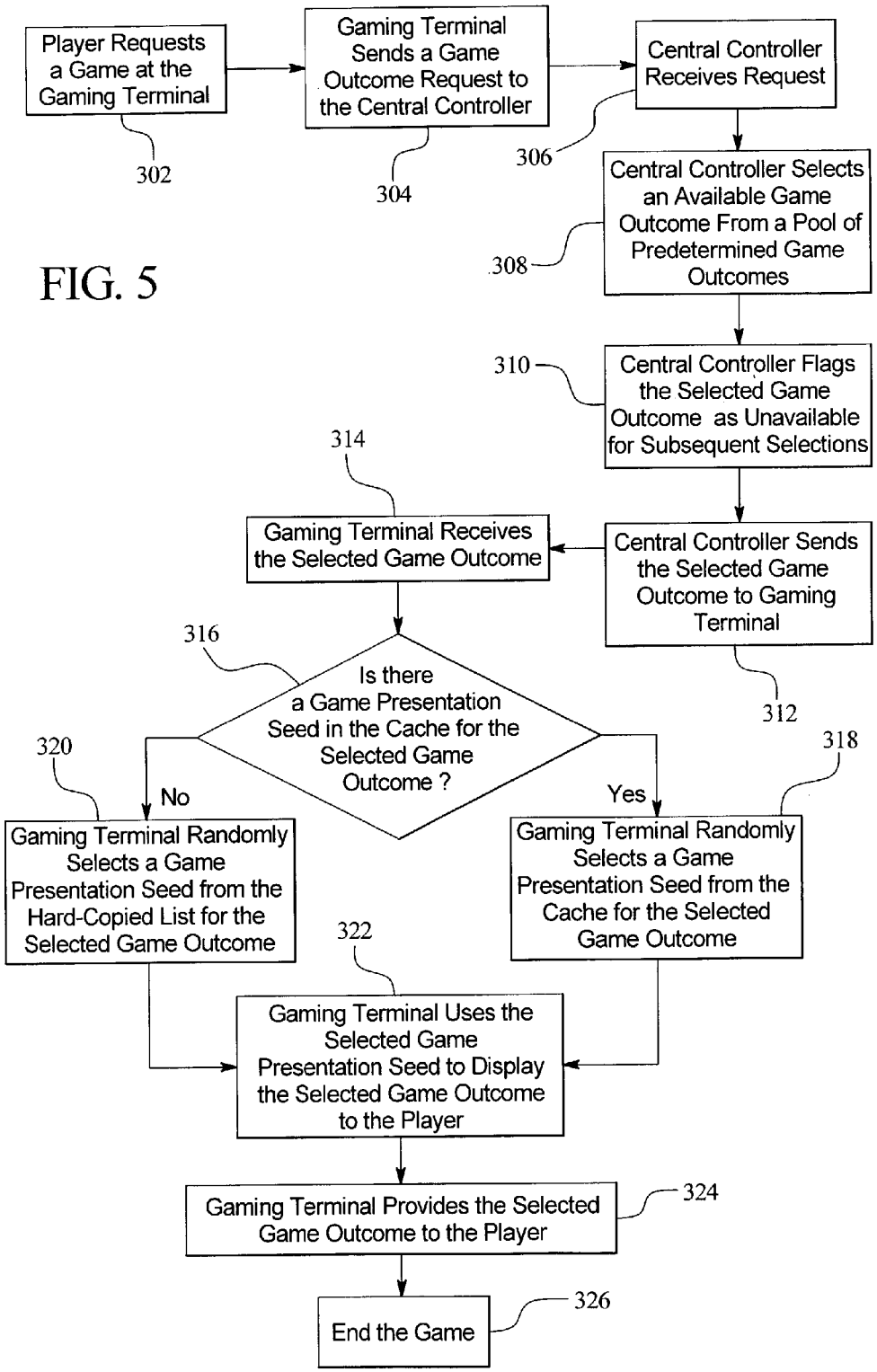
FIG. 5 is a schematic block diagram illustrating one embodiment of the present invention wherein the central controller determines a game outcome and the gaming terminal determines a presentation for the determined game outcome.

FIG. 5 illustrates one embodiment of the central controller providing a game outcome to an individual gaming terminal and the gaming terminal determining how the provided game outcome is presented or displayed to the player. In this embodiment, a player initiates game play at one of the plurality of gaming terminals in the network as indicated in block 302. For example, in the embodiment illustrating a slot machine gaming terminal, the player inserts the appropriate amount of money or tokens and then pulls the arm or pushes the play button. The reels will then begin to spin. As the reels are spinning, the gaming terminal sends a game play request for a game outcome to the central controller as indicated in block 304. In an alternative embodiment, the gaming terminal sends a game play request for a game outcome upon the player inputting a wager amount. The central controller receives the game play request as indicated in block 306. The central controller randomly selects an available game outcome from a set or pool of predetermined game outcomes as indicated in block 308.

Each predetermined game outcome includes a predetermined outcome component and a predetermined value component. An outcome component is either a win, a lose or a secondary or bonus game triggering event. A value component is the pay amount which can include any positive number of credits or currency units, zero credits or currency units or any negative number of credits or currency units. It should be appreciated that the negative value component is preferably employed in a bonus or secondary game of the present invention.

Each set or pool of predetermined game outcomes includes a plurality of predetermined game outcomes. In one embodiment, the central controller maintains at least one set or pool of predetermined game outcomes. In another embodiment, the central controller maintains a plurality of sets or pools of predetermined game outcomes. In an alternative embodiment, the central controller maintains at least one set or pool of predetermined game outcomes for each game provided on the gaming terminals. In another alternative embodiment, the central controller maintains at least one set or pool of predetermined game outcome seeds that the gaming terminal utilizes to determine a game outcome. In this embodiment, a plurality of different seeds in the same set or pool may each determine the same game outcome. Other suitable methods for storing the pool or set of predetermined may be employed in accordance with the present invention.

After randomly selecting an available game outcome, the central controller flags the selected game outcome as marked or used as indicated in block 310. Once flagged, a game outcome cannot be selected from the same pool or set by the central controller upon a subsequent game outcome selection. It should be appreciated that if the pool or set includes more than one of the same game outcome, then only the flagged game outcome cannot be selected upon a subsequent game outcome selection. For example, if a pool or set includes thirty win $5 game outcomes and one is selected and flagged, the flagged win $5 game outcome cannot be selected again but the other twenty-nine non-selected win $5 game outcomes remain available for subsequent game outcome selections.

The central controller sends the selected game outcome to the requesting gaming terminal as indicated in block 312. It should be appreciated that other suitable methods of communicating a game outcome to a requesting gaming terminal may be employed in accordance with the present invention.

Upon receiving the selected game outcome, as indicated in block 314, the gaming terminal determines how the provided game outcome will be presented or displayed to the player. For example, in a slot machine game, the gaming terminal determines what reel symbol combination that corresponds to the selected game outcome will be displayed or presented to the player. This determination is accomplished by the gaming terminal accessing the generated table or cache of game presentation seeds for the specific game played (i.e., for a specific bet combination) to determine whether there is a game presentation seed stored in the table or cache that corresponds to the selected game outcome as indicated in diamond 316. For example, if the selected game outcome is a $5 win outcome, the gaming terminal determines if there is at least one game presentation seed stored in the table or cache that is indexed as a $5 win outcome for the bet combination played.

If at least one game presentation seed that corresponds to the selected game outcome is stored and indexed in the table or cache (that is, at least one game presentation seed is deterministic of a game outcome presentation that is associated with or corresponds to the selected game outcome), the gaming terminal randomly selects a game presentation seed that corresponds to the selected game outcome as indicated in block 318. For example, in a slot machine game, if the selected game outcome is a $5 win outcome and the table or cache includes thirty different game presentation seeds that each correspond to a $5 win outcome, such as thirty different reel symbol combinations that each result in a $5 win game outcome, the gaming terminal randomly selects one of the thirty stored game presentation seeds. It should be appreciated that there may be a plurality of each different game presentation seed stored in the table or cache, thus the gaming terminal may select one of hundreds or thousands of game presentation seeds for each specific game outcome. By the gaming terminal providing a plurality of game outcome presentations (based on the plurality of game presentation seeds) for each game outcome and randomly selecting each provided game outcome presentation, the present invention retains the random feel of a probability based gaming terminal while still providing predetermined game outcomes. Moreover, enabling the gaming terminal to determine how each selected game outcome is displayed or presented to the player significantly reduces the computational load on the central controller.

In one embodiment of the present invention, as each game presentation seed is selected by the gaming terminal it is flagged as marked or used in the table or cache. Once flagged, a game presentation seed cannot be selected again in a subsequent selection. In this embodiment, in order to avoid the table or cache from being depleted of available game presentation seeds, the gaming terminal is continuously generating and indexing additional game presentation seeds to replace the flagged game presentation seeds.

If a game presentation seed that corresponds to the selected game outcome is not stored in the cache, the gaming terminal accesses the hard-copied or predetermined list of game presentation seeds as indicated in block 320. The gaming terminal randomly selects a game presentation seed from the hard-copied or predetermined list that corresponds to the selected game outcome. The hard-copied list enables the continuous operation of the gaming terminal by providing a game presentation seed if a game presentation seed is unavailable from the generated cache or table. For example, if a game is initiated on the gaming terminal prior to the gaming terminal generating a game presentation seed for the selected game outcome, such as a player initiates a game immediately after the gaming terminal becomes operational for game play, the hard-copied or predetermined list enables the gaming terminal to select an appropriate game presentation seed to present or display the provided game outcome to the player.

Regardless of the source of the selected game presentation seed (from the gaming terminal generated cache or the hard-copied list), the gaming terminal utilizes the selected game presentation seed in a random number generating algorithm to generate at least one and preferably a plurality of random numbers. The generated random numbers are used to determine a game outcome presentation. For example, using the selected game presentation seed indexed as a $10 win outcome, the gaming terminal generates three random numbers. The gaming terminal utilizes the first generated random number to determine that the first reel stops displaying a X symbol. The gaming terminal utilizes the second generated random number to determine that the second reel stops displaying a O symbol. The gaming terminal utilizes the third generated random number to determine that the third reel stops displaying a X symbol. Thus, the selected game presentation seed corresponds to a game outcome presentation of an X-O-X reel symbol combination. It should be appreciated that with reference to the pay table of the played game, the game outcome presentation of an X-O-X reel symbol combination corresponds to a $10 win outcome.

The gaming terminal presents or displays the determined game outcome presentation to the player as indicated in block 322. The payout amount, if any, for the selected game outcome is provided to the player as indicated in block 324. If the provided game outcome is a win game outcome or a lose game outcome, the game ends as indicated in block 326. If the provided game outcome is a bonus or secondary game triggering outcome (not shown), the game proceeds to enable the player to play at least one bonus or secondary game. It should be appreciated that if the provided game outcome is a bonus or secondary game triggering outcome, the bonus or secondary game proceeds as described above. That is, in the bonus or secondary game, the central controller provides a predetermined secondary game outcome and the gaming terminal determines how the provided secondary game outcome is presented or displayed to the player.

In an alternative embodiment of the present invention, the central controller is operable to maintain one pool or set of predetermined game outcomes for a plurality of gaming terminals that are each playing a different game. In this embodiment, since the central controller determines the game outcome and the individual gaming terminal determines how the game outcome is displayed or presented to the player, a plurality of gaming terminals playing a plurality of different games can each utilize the same set or pool of game outcomes (assuming each gaming terminal playing a different game is utilizing the same algorithm to generate the same random numbers from the same game presentation seed). That is, the game outcome selected by the central controller can be implemented into a plurality of different games because the individual gaming terminals each determine how the selected game outcome is displayed or presented to the player. For instance, while a slot machine gaming terminal presents a $2 win as a specific reel symbol combination, a poker style gaming terminal presents the same $2 win as a specific hand of cards. In either case, the central controller selects a $2 win game outcome, flags the selected game outcome in the pool or set and sends the selected game outcome to the appropriate gaming terminal. The gaming terminal determines how the $2 win game outcome is presented to the player with no input from the central controller. In this embodiment, the pay table or payout percentage must be the same for each game utilizing the same set or pool of predetermined game outcomes.

In an alternative embodiment of the present invention, the central controller maintains at least one pool or set of predetermined game outcome seeds. Each game outcome seed is a unique random number seed which is deterministic of a game outcome, such as a win outcome, a lose outcome or a secondary or bonus game triggering outcome. In this embodiment, each game outcome seed that is deterministic of a win game outcome or a secondary or bonus game triggering outcome is also deterministic of a game outcome presentation. That is, the gaming terminal utilizes the same game outcome seed to determine both a win game outcome or secondary game triggering outcome and how the win game outcome or secondary game triggering outcome is presented or displayed to the player. In this embodiment, as the central controller is determining how each of the win game outcomes and secondary game triggering outcomes are presented or displayed to the player, the table or cache of game presentation seeds generated and maintained by the gaming terminal includes game presentation seeds that correspond only to lose game outcomes with a payout value of $0. This embodiment enables the gaming terminal to determine how each lose outcome is presented, while enabling the central controller to determine how each win outcome is displayed or presented to the player.

Figure 6:
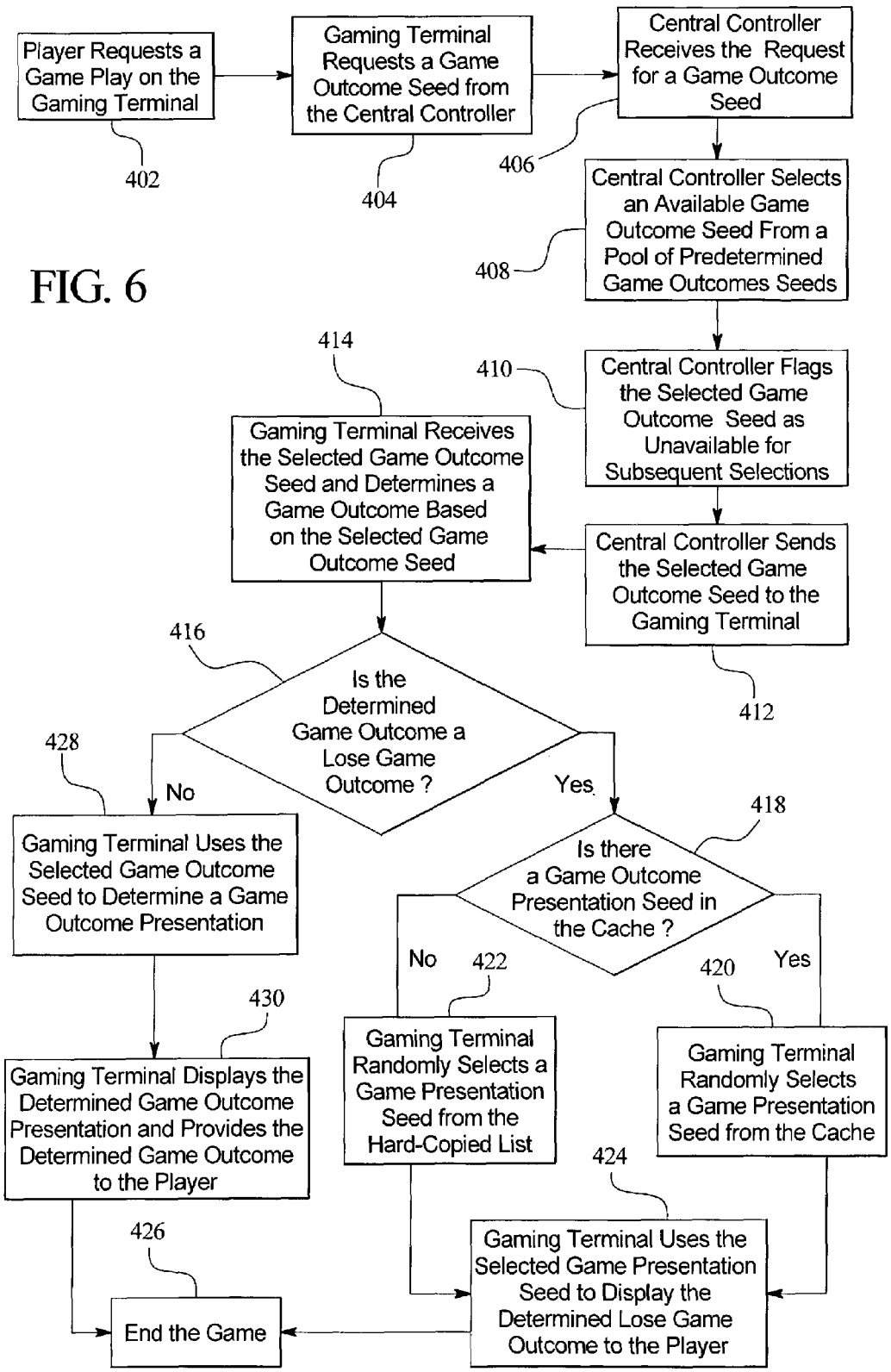
FIG. 6 is a schematic block diagram illustrating an alternative embodiment of the present invention wherein the central controller dictates a win game outcome or secondary game triggering outcome presentation and the gaming terminal determines a presentation of a determined lose game outcomes.

As illustrated in FIG. 6, this embodiment proceeds as described above, wherein upon a request for a game outcome seed by a gaming terminal as indicated in block 404, the central controller selects a game outcome seed from a set of predetermined game outcome seeds as indicated in block 406. The central controller flags the selected game outcome seed (thus preventing it from further selection from the same pool or set) as indicated in block 408. The central controller then communicates the selected game outcome seed to the gaming terminal as indicated in block 410. Upon receiving the selected game outcome seed, the gaming terminal determines the game outcome for the selected game outcome seed as indicated in block 414. The gaming terminal determines the game outcome for the selected game outcome seed by the gaming terminal utilizing the selected game outcome seed in a random number generating algorithm to generate at least one and preferably a plurality of random numbers. The gaming terminal uses the generated random numbers to determine a game outcome to be provided to the player. Procedures for generating random numbers from a given random number seed and utilizing the generated random numbers to determine a game outcome are well known in the art.

After the gaming terminal determines the appropriate game outcome, the gaming terminal determines if the determined game outcome is a lose game outcome with a payout amount of $0 as indicated in diamond 416. If the determined game outcome is a lose game outcome with a payout amount of $0, the gaming terminal proceeds by randomly selecting a game presentation seed from the generated cache or hard-copied list and provides the selected game presentation seed as indicated in blocks 418 to 426 and as described above.

If the determined game outcome is not a lose game outcome with a value of $0 but rather is a win game outcome or a bonus game triggering outcome, the gaming terminal utilizes the selected game play seed to determine a game outcome presentation for the determined game outcome as indicated in block 428. This determination is accomplished by the gaming terminal utilizing the selected game play seed to further generate at least one and preferably a plurality of additional random numbers that are then used to determine the presentation of the determined game outcome. For example, in a slot machine gaming terminal, if the gaming terminal determines that the game outcome is a win $10 outcome, the gaming terminal may generate three additional random numbers using the selected game play seed. The three additional random numbers are used to determine the stop positions of the reels. It should be appreciated that even though the gaming terminal is generating random numbers to determine how the game outcome is displayed or presented to the player, the generated random numbers are based on the predetermined game outcome seed. Thus, the central controller is indirectly determining how each win game outcome and each bonus or secondary game triggering outcome is displayed or presented to the player. The determined game presentation and the determined game outcome are provided to the player as indicated in block 430. If the provided game outcome is a win game outcome or a lose game outcome, the game ends as indicated in block 426. If the provided game outcome is a bonus or secondary game triggering outcome (not shown), the game proceeds to enable the player to play at least one bonus or secondary game. In the bonus or secondary game, the central controller provides a predetermined secondary game outcome and the gaming terminal determines how the provided secondary game outcome is presented or displayed to the player.

In an alternative embodiment, the central controller maintains a set or pool of game outcomes wherein each win game outcome and each bonus or secondary game triggering outcome is associated with a game presentation. In this embodiment, the gaming terminal randomly selects a game outcome and if the selected game outcome is a win game outcome or a secondary game triggering outcome, the central controller communicates the selected game outcome and the game presentation associated with the selected game outcome to the gaming terminal. The gaming terminal displays the associated game presentation and provides the player the selected game outcome. If the provided game outcome is a win game outcome, the game ends. If the provided game outcome is a secondary game triggering outcome, the gaming terminal enables a player to play a secondary or bonus game. If the game outcome is a lose game outcome, the central controller communicates the selected lose game outcome to the gaming terminal and the gaming terminal determines a game presentation for the selected game outcome based on a game presentation seed as described above.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A gaming terminal comprising:
   a memory storage device;
   a cache of game presentation seeds stored in said memory storage device, wherein said cache includes a plurality of game presentation seeds and each game presentation seed is deterministic of a game outcome presentation;
   a display device; and
   a processor operable with said display device and said memory storage device to enable a player to initiate a wagering game, to receive a game outcome from a central controller for said wagering game, to select a game presentation seed from said cache of game presentation seeds based on said received game outcome, to determine a game outcome presentation based on said selected game presentation seed, to display the determined game outcome presentation for said wagering game and to provide the received game outcome to the player for said wagering game.

2. The gaming terminal of claim 1, wherein each game outcome presentation is associated with a game outcome.

3. The gaming terminal of claim 1, wherein a plurality of game presentation seeds are each deterministic of a different game outcome presentation.

4. The gaming terminal of claim 3, wherein a plurality of different game outcome presentations are each associated with the same game outcome.

5. The gaming terminal of claim 1, wherein said received game outcome is a win outcome, a lose outcome or a secondary game triggering outcome.

6. The gaming terminal of claim 5, wherein if the received game outcome is a secondary game triggering outcome, the processor enables the player to play at least one secondary game.

7. The gaming terminal of claim 1, wherein said cache of game presentation seeds includes at least one game presentation seed for each game outcome presentation.

8. The gaming terminal of claim 1, wherein said cache of game presentation seeds includes a plurality of game presentation seeds for each game outcome presentation.

9. The gaming terminal of claim 1, which includes a predetermined list of game presentation seeds, wherein said predetermined list of game presentation seeds includes a plurality of game presentation seeds that are each deterministic of a game outcome presentation.

10. The gaming terminal of claim 9, wherein said predetermined list of game presentation seeds includes at least one game presentation seed for each game outcome presentation.

11. The gaming terminal of claim 9, wherein said predetermined list of game presentation seeds includes a plurality of game presentation seeds for each game outcome presentation.

12. The gaming terminal of claim 9, wherein said processor selects a game presentation seed from said predetermined list of game presentation seeds based on said received game outcome, if said cache of game presentation seeds does not include at least one game presentation seed that is deterministic of a game outcome presentation for the received game outcome.

13. A gaming terminal comprising:
    a memory storage device;
    a cache of game presentation seeds stored in said memory storage device, wherein said cache includes a plurality of game presentation seeds and each game presentation seed is deterministic of a game outcome presentation;
    a display device; and
    a processor operable with said display device and said memory storage device to generate said cache of game presentation seeds, to enable a player to initiate a wagering game, to receive a game outcome seed from a central controller for said wagering game, to calculate a game outcome for said wagering game based on said received game outcome seed, to select a game presentation seed from said cache of game presentation seeds based on said calculated game outcome, to determine a game outcome presentation based on said selected game presentation seed, to display the determined game outcome presentation for said wagering game and to provide the calculated game outcome to the player for said wagering game.

14. The gaming terminal of claim 13, which includes a predetermined list of game presentation seeds.

15. The gaming terminal of claim 14, wherein said processor is operable to select a game presentation seed from said predetermined list of game presentation seeds based on said calculated game outcome, if said cache of game presentation seeds does not include at least one game presentation seed that is deterministic of a game outcome presentation for the calculated game outcome.

16. The gaming terminal of claim 13, wherein said calculated game outcome is a win outcome, a lose outcome or a secondary game triggering outcome.

17. The gaming terminal of claim 16, wherein if the calculated game outcome is a secondary game triggering outcome, the processor enables the player to play at least one secondary game.

18. A gaming terminal comprising:
    a memory storage device;
    a cache of game presentation seeds stored in said memory storage device, wherein said cache includes a plurality of game presentation seeds and each game presentation seed is deterministic of a game outcome presentation;
    a display device; and
    a processor operable with said display device and said memory storage device to enable a player to initiate a wagering game, to receive from a central controller a game outcome and a game outcome presentation, if any, associated with the received game outcome, to select a game presentation seed from said cache of game presentation seeds based on said received game outcome if said received game outcome is a lose outcome, to determine a game outcome presentation based on said selected game presentation seed, to display the determined game outcome presentation for said wagering game, to display the received game outcome presentation for said wagering game if the received game outcome is a win outcome with an associated game outcome presentation or a secondary game triggering outcome with an associated game outcome presentation and to provide the received game outcome to the player for said wagering game.

19. The gaming terminal of claim 18, wherein if the received game outcome is a secondary game triggering outcome, the processor enables the player to play at least one secondary game.

20. The gaming terminal of claim 18, which includes a predetermined list of game presentation seeds.

21. The gaming terminal of claim 20, wherein said processor is operable to select a game presentation seed from said predetermined list of game presentation seeds based on said received game outcome, if said received game outcome is a lose outcome and said cache of game presentation seeds does not include at least one game presentation seed that is deterministic of a game outcome presentation for the received game outcome.

22. A gaming terminal comprising:
a memory storage device;
a cache of game presentation seeds stored in said memory storage device, wherein said cache includes a plurality of game presentation seeds and each game presentation seed is deterministic of a game outcome presentation;
a display device; and
a processor operable with said display device and said memory storage device to generate said cache of game presentation seeds, to enable a player to initiate a wagering game, to receive a game outcome seed for said wagering game sent from a central controller, to calculate a game outcome based on said received game outcome seed wherein said calculated game outcome is a win outcome, a lose outcome or a secondary game triggering outcome, to select a game presentation seed based on said calculated game outcome if said calculated game outcome is a lose outcome, to determine a game outcome presentation based on said selected game presentation seed, to determine a game outcome presentation based on said received game outcome seed if said calculated game outcome is a win outcome or a secondary game triggering outcome, to display the determined game outcome presentation for said wagering game and to provide the calculated game outcome to the player for said wagering game.

23. A central determination gaming system comprising:
a game outcome set including a plurality of predetermined game outcomes, wherein each game outcome is a lose outcome with no associated outcome presentation, a win outcome associated with a game outcome presentation or a secondary game triggering outcome associated with a game outcome presentation;
a central controller operable to select at least one of said game outcomes from the game outcome set, to flag said selected game outcome and to output the selected game outcome and the associated game outcome presentation, if any; and
at least one gaming terminal including a display device and a processor operable with said central controller and said display device to enable a player to initiate a wagering game, to receive said selected game outcome and the game outcome presentation, if any, from said central controller, to determine a game outcome presentation for the selected game outcome based on a game presentation seed if the selected game outcome is a lose outcome, to display the determined game outcome presentation, to display the associated game outcome presentation for said wagering game if the selected game outcome is a win outcome or a secondary game triggering outcome and to provide the selected game outcome to the player for said wagering game.

24. The central determination gaming system of claim 23, which includes a plurality of game outcome sets.

25. The central determination gaming system of claim 23, wherein said game outcome set includes a plurality of each predetermined game outcome.

26. The central determination gaming system of claim 23, wherein if the selected game outcome is a secondary game triggering outcome, the processor of the gaming terminal enables the player to play at least one secondary game.

27. The central determination gaming system of claim 23, wherein the processor of the gaming terminal is operable to request a game outcome and the central controller outputs said selected game outcome upon said request.

28. The central determination gaming system of claim 23, wherein said central controller maintains said game outcome set.

29. The central determination gaming system of claim 23, which includes a plurality of gaming terminals.

30. The central determination gaming system of claim 23, wherein the processor of the gaming terminal is operable to determine a different game outcome presentation for a plurality of lose game outcomes in said game outcome set wherein each different game outcome presentation is based on a different game presentation seed.

31. The central determination gaming system of claim 23, wherein the processor of the gaming terminal is operable to determine a different game outcome presentation for each lose game outcome in said game outcome set wherein each different game outcome presentation is based on a different game presentation seed.

32. The central determination gaming system of claim 23, wherein the processor of the gaming terminal is operable to generate and maintain a cache of game presentation seeds, wherein each game presentation seed is deterministic of a game outcome presentation associated with a lose game outcome.

33. The central determination gaming system of claim 32, wherein said cache of game presentation seeds includes at least one game presentation seed deterministic of each game outcome presentation that is associated with a lose game outcome.

34. The central determination gaming system of claim 32, wherein said cache of game presentation seeds includes a plurality of game presentation seeds deterministic of each game outcome presentation that is associated with a lose game outcome.

35. The central determination gaming system of claim 25, wherein the processor of the gaming terminal is operable to maintain a predetermined list of game presentation seeds, wherein each game presentation seed is deterministic of the game outcome presentation that is associated with a lose game outcome.

36. The central determination gaming system of claim 35, wherein said predetermined list of game presentation seeds includes at least one game presentation seed that is deterministic of each game outcome presentation that is associated with a lose game outcome.

37. The central determination gaming system of claim 35, wherein said predetermined list of game presentation seeds includes a plurality of game presentation seeds deterministic of each game presentation that is associated with a lose game outcome.

38. The central determination gaming system of claim 23, wherein said central controller is operable to randomly select said game outcome from the game outcome set.

39. A central determination gaming system comprising:
a game outcome set including a plurality of predetermined game outcomes, wherein each game outcome is a lose outcome with no associated outcome presentation, a win outcome associated with a game outcome presentation or a secondary game triggering outcome associated with a game outcome presentation; and
a central controller operable to select at least one of said game outcomes from the game outcome set, to prevent said selected game outcome from further selection in said game outcome set and to output the selected game outcome and the associated game outcome presentation, if any.

40. The central determination gaming system of claim 39, wherein said central controller is operable to randomly select said game outcome from said game outcome set.

41. The central determination gaming system of claim 39, which includes a plurality of game outcome sets.

42. The central determination gaming system of claim 39, wherein said game outcome set includes a plurality of each predetermined game outcome.

43. A central determination gaming system comprising:
a game outcome set including a plurality of predetermined game outcomes, wherein each game outcome is a lose outcome with no associated outcome presentation, a win outcome associated with a game outcome presentation or a secondary game triggering outcome associated with a game outcome presentation; and
a central controller operable to select at least one of said game outcomes from the game outcome set, to prevent said selected game outcome from further selection in said game outcome set and to output the selected game outcome and the associated game outcome presentation, if any, to at least one gaming terminal, wherein said gaming terminal includes a display device and a processor operable with said display device to enable a player to initiate a wagering game, to receive said selected game outcome and the game outcome presentation, if any, from said central controller, to determine a game outcome presentation for the selected game outcome based on a game presentation seed if the selected game outcome is a lose outcome, to display the determined game outcome presentation for said wagering game, to display the associated game outcome presentation for said wagering game if the selected game outcome is a win outcome or a secondary game triggering outcome and to provide the selected game outcome to the player for said wagering game.

44. A method of operating a wagering gaming terminal, said method comprising the steps of:
(a) generating a cache of game presentation seeds;
(b) enabling a player to initiate play of a wagering game;
(c) receiving a game outcome from a central controller for said wagering game;
(d) selecting a game presentation seed based on said received game outcome;
(e) determining a game outcome presentation based on said selected game presentation seed;
(f) displaying the determined game outcome presentation for said wagering game; and
(g) providing said received game outcome to the player for said wagering game.

45. The method of claim 44, wherein said step of generating a cache of game presentation seeds includes the steps of:
(i) randomly generating a game presentation seed;
(ii) selecting a bet combination;
(iii) determining a game outcome presentation based on said generated game presentation seed;
(iv) determining a game outcome based on said determined game outcome presentation and said selected bet combination;
(v) determining if the cache for the determined game outcome and selected bet combination is at or above a predetermined level of game presentation seeds;
(vi) determining if the cache for the determined game outcome and selected bet combination contains the generated game presentation seed, if the cache for the determined game outcome and the selected bet combination is not at or above the predetermined level of game presentation seeds;
(vii) adding the generated game presentation seed to said cache if said cache does not contain the generated game presentation seed for the determined game outcome and selected bet combination;
(ix) indexing said generated game presentation seed in said cache according to the determined game outcome and selected bet combination;
(x) selecting another bet combination if the cache is at or above the predetermined level of game presentation seeds for the determined game outcome and selected bet combination or if said cache does contain the generated game presentation seed for the determined game outcome and selected bet combination; and
(xi) repeating steps (i) to (x) until the cache is at or above the predetermined level of game presentation seeds for each bet combination.

46. The method of claim 44, wherein said game presentation seed is selected from said cache of game presentation seeds.

47. The method of claim 44, wherein said game presentation seed is selected from a predetermined list of game presentation seeds, if said cache of game presentation seeds does not include a game presentation seed based on said received game outcome.

48. A method of operating a gaming terminal, said method comprising the steps of:
(a) enabling a player to initiate a play of a wagering game;
(b) receiving a game outcome seed from a central controller for said wagering game;
(c) determining a game outcome based on said received game outcome seed;
(d) selecting a game presentation seed based on said determined game outcome;
(e) determining a game outcome presentation based on said selected game presentation seed;
(f) displaying the determined game outcome presentation for said wagering game; and
(g) providing said determined game outcome to the player for said wagering game.

49. A method of operating a gaming terminal, said method comprising the steps of:
(a) generating a cache of game presentation seeds;
(b) enabling a player to initiate a wagering game;
(c) receiving a game outcome and a game outcome presentation, if any, associated with the received game outcome from a central controller for said wagering game;
(d) selecting a game presentation seed from said cache of game presentation seeds based on said received game outcome if said received game outcome is a lose outcome;
(e) determining a game outcome presentation based on said selected game presentation seed, if said received game outcome is a lose outcome;
(f) displaying the determined game outcome presentation for said wagering game, if said received game outcome is a lose outcome;
(g) displaying the received game outcome presentation for said wagering game if the received game outcome is a win outcome with an associated game outcome presentation or a secondary game triggering outcome with an associated game outcome presentation; and (h) providing the received game outcome to the player for said wagering game.

50. A method of operating a gaming terminal, said method comprising the steps of:
- (a) enabling a player to initiate play of a wagering game;
- (b) receiving a game outcome seed from a central controller for said wagering game;
- (c) determining a game outcome based on said received game outcome seed, wherein each game outcome is a win outcome, a lose outcome or a secondary game triggering outcome;
- (d) selecting a game presentation seed based on said determined game outcome, if said determined game outcome is a lose outcome;
- (e) determining a game outcome presentation based on said selected game presentation seed, if said determined game outcome is a lose outcome;
- (f) determining a game outcome presentation based on said received game outcome seed, if said determined game outcome is a win outcome or a secondary game triggering outcome;
- (g) displaying the determined game outcome presentation for said wagering game; and
- (h) providing said determined game outcome to the player for said wagering game.

51. A method of generating a cache of game presentation seeds for a gaming terminal comprising the steps of:
- (a) randomly generating a game presentation seed;
- (b) selecting a bet combination;
- (c) determining a game outcome presentation based on said generated game presentation seed;
- (d) determining a game outcome based on said determined game outcome presentation and said selected bet combination;
- (e) determining if the cache for the determined game outcome and selected bet combination is at or above a predetermined level of game presentation seeds;
- (f) determining if the cache for the determined game outcome and selected bet combination contains the generated game presentation seed, if the cache for the determined game outcome and the selected bet combination is not at or above the predetermined level of game presentation seeds;
- (g) adding the generated game presentation seed to said cache if said cache does not contain the generated game presentation seed for the determined game outcome and selected bet combination;
- (h) indexing said generated game presentation seed in said cache according to the determined game outcome and selected bet combination;
- (i) selecting another bet combination if the cache is at or above the predetermined level for the determined game outcome and selected bet combination, the cache for the determined game outcome and the selected bet combination is at or above the predetermined level of game presentation seeds; or if said cache does contain the generated game presentation seed for the determined game outcome and selected bet combination; and
- (j) repeating steps (a) to (l) until the cache is at or above the predetermined level of game presentation seeds for each bet combination.

* * * * *

UNITED STATES PATENT AND TRADEMARK OFFICE
CERTIFICATE OF CORRECTION

PATENT NO. : 6,988,946 B2
DATED : January 24, 2006
INVENTOR(S) : Richard E. Michaelson et al.

It is certified that error appears in the above-identified patent and that said Letters Patent is hereby corrected as shown below:

Column 1,
Line 8, change "following commonly" to -- following co-pending commonly --.

Signed and Sealed this

Twenty-fifth Day of April, 2006

JON W. DUDAS
*Director of the United States Patent and Trademark Office*